US010336430B2

(12) United States Patent
Kosso et al.

(10) Patent No.: US 10,336,430 B2
(45) Date of Patent: Jul. 2, 2019

(54) POD PROPULSION UNIT OF A SHIP

(71) Applicant: ABB Schweiz AG, Baden (CH)

(72) Inventors: Antto Kosso, Helsinki (FI); Lasse Lahtinen, Vantaa (FI); Petri Säkkinen, Espoo (FI)

(73) Assignee: ABB Schweiz AG, Baden (CH)

( * ) Notice: Subject to any disclaimer, the term of this patent is extended or adjusted under 35 U.S.C. 154(b) by 109 days.

(21) Appl. No.: 15/363,973

(22) Filed: Nov. 29, 2016

(65) Prior Publication Data

US 2017/0081007 A1 Mar. 23, 2017

Related U.S. Application Data

(63) Continuation of application No. PCT/EP2015/061269, filed on May 21, 2015.

(30) Foreign Application Priority Data

May 30, 2014 (EP) .................................... 14170562

(51) Int. Cl.
*B63J 2/12* (2006.01)
*H02K 9/12* (2006.01)
(Continued)

(52) U.S. Cl.
CPC ................ *B63H 21/17* (2013.01); *B63J 2/12* (2013.01); *H02K 9/10* (2013.01); *H02K 9/12* (2013.01);
(Continued)

(58) Field of Classification Search
CPC .... B63H 2005/1254; B63H 2005/1258; B63H 21/17; B63H 23/24; B63J 2/12; H02K 9/10; H02K 9/12; H02K 21/00
See application file for complete search history.

(56) References Cited

U.S. PATENT DOCUMENTS 5,403,216 A    4/1995  Salmi et al.
6,312,298 B1   11/2001 Schüring
(Continued)

FOREIGN PATENT DOCUMENTS

EP    2420443 A1    2/2012
GB    2378691 A     2/2003
(Continued)

OTHER PUBLICATIONS

International Search Report, PCT/EP2015/061269, ABB Oy, dated Sep. 10, 2016, 4 pages.
(Continued)

*Primary Examiner* — Ajay Vasudeva
(74) *Attorney, Agent, or Firm* — Taft Stettinius & Hollister LLP; J. Bruce Schelkopf

(57) ABSTRACT

The invention relates to a pod propulsion unit of a ship. The pod propulsion unit comprises a pod housing arranged at least partly below a hull of the ship, an electric propeller motor within a motor gondola of the pod housing, an annular gap between a rotor and a stator of the electric propeller motor, and gas channels extending through the rotor, a closed cooling gas circuit, and a fan for circulating gas in the closed cooling gas circuit. The closed cooling gas circuit comprising a feeding duct extending between the return duct and the first motor end face of the electrical propeller motor, and a return duct extending between the feeding duct and the opposite second motor end face of the electrical propeller motor.

22 Claims, 8 Drawing Sheets

(51) Int. Cl.
*B63H 21/17* (2006.01)
*B63H 23/24* (2006.01)
*B63H 5/125* (2006.01)
*H02K 9/10* (2006.01)
*H02K 21/00* (2006.01)

(52) U.S. Cl.
CPC ............ *H02K 21/00* (2013.01); *B63H 23/24* (2013.01); *B63H 2005/1258* (2013.01)

(56) References Cited

U.S. PATENT DOCUMENTS

| | | | |
|---|---|---|---|
| 6,935,907 B2 | 8/2005 | Lönngren | |
| 6,994,602 B2 | 2/2006 | Ries | |
| 7,061,147 B2 * | 6/2006 | Ries | B63H 5/125 310/51 |
| 7,186,156 B2 * | 3/2007 | Le Flem | B63H 5/125 440/6 |
| 7,189,126 B2 * | 3/2007 | Ylitalo | B63H 5/125 310/52 |
| 7,448,929 B2 * | 11/2008 | Huber | B63H 23/24 440/6 |
| 2015/0017033 A1 * | 1/2015 | Sakkinen | H02K 7/14 417/423.8 |

FOREIGN PATENT DOCUMENTS

| | | | |
|---|---|---|---|
| JP | H06191484 A | | 7/1994 |
| JP | H11278379 A | | 10/1999 |
| JP | 2002096797 A | | 4/2002 |
| JP | 2002362487 A | * | 12/2002 |
| JP | 2002362487 A | | 12/2002 |
| JP | 2003209210 A | | 7/2003 |
| JP | 2004533363 A | | 11/2004 |
| JP | 2004538200 A | | 12/2004 |
| JP | 2005186748 A | | 7/2005 |
| SG | 10201403077 T | | 2/2015 |

OTHER PUBLICATIONS

European Search Report, EP14170562.4: ABB Oy, dated Sep. 18, 2014, 7 pages.
International Preliminary Report on Patentability, PCT/EP2015/061269, ABB Oy, dated May 2, 2016, 7 pages.
Office Action for Singaporean Application No. 11201609683U, dated Oct. 17, 2017, 6 pages.
Office Action for corresponding JP Application No. 2016-570272, dated Oct. 31, 2017, 5 pages, (Japanese language).

* cited by examiner

POD PROPULSION UNIT OF A SHIP

FIELD OF THE INVENTION

The invention relates to a pod propulsion unit of a ship as defined in the preamble of independent claim 1.

Air cooling of high-power electric motors of pod propulsion units require a large cooling air unit that additionally must be doubled for redundancy. In addition, needed cooling air ducts arranged around the stator makes the diameter of a motor housing part of the pod propulsion unit bigger and the structure of the motor housing part more complex. Bigger diameter increases the drag of the hull and lowers hydrodynamic efficiency. In pod propulsion units, which are turnable attached to the ship by means of slewing bearing and which comprise a slip ring between a power plant within the hull of the ship and an electric propeller motor within pod propulsion unit for supplying electrical power from the power plant to the electric propeller motor, cooling air of pod propulsion units goes through a slip ring between the hull of the ship and the pod propulsion unit and this leads to two problems: 1) filters are needed to prevent coal dust originating from the slip ring to enter the electric motor and 2) possible oil contamination of the slip ring due to oil in the cooling air originating from propeller shaft bearings in case of leaking oil seal.

Direct sea water cooling is not an effective way for cooling asynchronous electric motors due to rotor losses. Therefore expensive synchronous electric motors with permanent-magnet excitation are often used.

Various cooling arrangements are known in the art.

Publication U.S. Pat. No. 5,403,216 a main propulsion arrangement for a high power ship or the like comprises an underwater drive unit connected to and turnable by a substantially vertical tubular shaft journalled in the ship. The drive unit and the tubular shaft define a hollow casing enclosing an electrical propulsion motor connected to a propeller shaft, which is connected to a driving propeller external of the casing. The casing is, at its inside, supported by several mainly vertical web plates, which are arranged to act, in combination, as elements structurally stiffening and supporting the casing, as elements securing the propulsion motor in place relative to the casing, as elements transmitting to the casing reaction forces to the torque developed by the propulsion motor, and as wall elements of ducts for incoming and outgoing gaseous coolant for the propulsion motor.

Publication U.S. Pat. No. 6,935,907 B2 presents a pod unit including a pod housing and an assembly unit, a so called seating, for the pod housing, wherein the seating has a lower portion and an upper portion as well as a base for the installation of the pod housing which comprises a lower casing portion for the accommodation of a propulsion unit, an intermediate portion comprising air ducts, and an upper portion, which is fixedly connected to a steering engine, with a gear ring to be fixed at the base. A cooling system having at least one fan is mounted within the seating.

Publication U.S. Pat. No. 6,994,602 B2 presents a ship propulsion system includes at least one marine propeller, at least one electric motor which drives the at least one marine propeller, and an inverter-fed power supply system which supplies the at least one electric motor with electric power. The power supply system includes at least one drive machine and at least one generator driven thereby. The at least one electric motor and the at least one generator are configured as three-phase synchronous machines. In order to reduce losses per kW installed power and thus to allow for a stronger energizing field in the stator winding, the at least one electric motor configured as a three-phase synchronous machine and/or the at least one generator configured as a three-phase synchronous machine of the power supply system is/are provided with an air-gap three-phase winding devoid of iron grooves as the power supply system. The bundle conductors of the winding are made from insulated thin cooper wires that are disposed in an annular gap between a rotor and a laminated iron yoke, and the air gap three phase winding is reinforced by a plastic structure and/or embedded in or impregnated with resin and to which a pertaining cooling device is connected by which the heat produced in the cooling device is dissipated.

OBJECTIVE OF THE INVENTION

The object of the invention is to provide a pod propulsion unit of a ship having an effective cooling arrangement.

SHORT DESCRIPTION OF THE INVENTION

The pod propulsion unit of a ship of the invention is characterized by the definitions of independent claim 1.

Preferred embodiments of the pod propulsion unit of a ship are defined in the dependent claims.

A preferred embodiment of the pod propulsion unit comprises a pod housing arranged at least partly below a hull of the ship. This preferred embodiment of the pod propulsion unit comprises an electric propeller motor within a motor gondola of the pod housing for rotating at least one propeller. In this preferred embodiment of the pod propulsion unit, the electric propeller motor has a rotor, a stator, an annular gap between the rotor and the stator, and gas channels extending through the rotor. In this preferred embodiment of the pod propulsion unit, the pod propulsion unit comprises a closed cooling gas circuit, wherein the annular gap between the rotor and the stator and the gas channels extending through the rotor forms a part of the closed cooling gas circuit. In this preferred embodiment of the pod propulsion unit, the pod propulsion unit comprises a fan for circulating gas such as air in the closed cooling gas circuit. In this preferred embodiment of the pod propulsion unit, the pod housing comprises a strut section between the hull of the ship and the motor gondola. In this preferred embodiment of the pod propulsion unit, the pod propulsion unit comprises at least one gas-liquid heat exchanger arranged in the closed cooling gas circuit for exchanging thermal energy between gas flowing in the closed cooling gas circuit and liquid circulating in at least one cooling liquid circuit. In this preferred embodiment of the pod propulsion unit, the stator of the electric propeller motor is fitted such as snug-fitted, form-fitted or shrink-fitted in a tubular section of the motor gondola of the pod housing of the pod propulsion unit. In this preferred embodiment of the pod propulsion unit, the tubular section of the motor gondola has a circumferential outer surface that forms a part of the outer surface of the pod housing so that by the stator of the electric propeller motor is cooled to water surrounding at least a circumferential section of the circumferential outer surface of the tubular section of the motor gondola through the wall of the tubular section of the motor gondola. In this preferred embodiment of the pod propulsion unit, the motor gondola is connected to the strut section by means of a first connection section and a second connection section of the strut section, which first connection section and second connection section of the strut section are spaced apart from each other so that an opening is formed between the first connection section and the second connection section of the strut section and the circumferential outer surface of the tubular section of the motor gondola so that at least a part of said circumferential section of the circumferential outer surface of the tubular section of the motor gondola is located in said opening.

LIST OF FIGURES

In the following the invention will described in more detail by referring to the figures, of which FIG. 1 shows the function principle of the cooling system of a pod propulsion unit according to a first embodiment, FIG. 2 is another view of a part of the pod propulsion unit shown in FIG. 1.

DETAILED DESCRIPTION OF THE INVENTION

Figure 1:
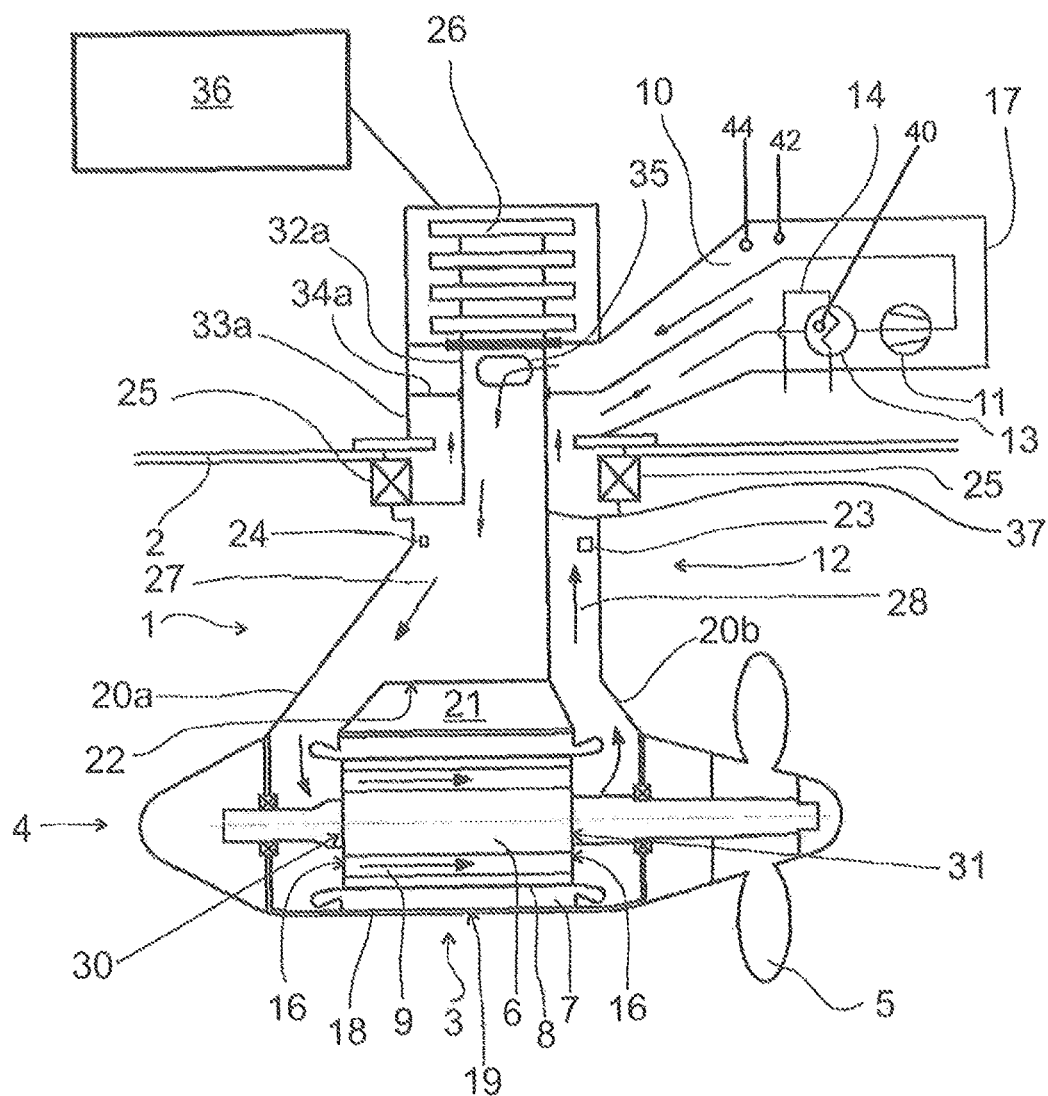

FIG. 1 shows an example of an embodiment of the pod propulsion unit of a ship.

The pod propulsion unit comprises a pod housing 1 arranged at least partly below a hull 2 of the ship (not marked with a reference numeral)

The pod propulsion unit comprises an electric propeller motor 3 within a motor gondola 4 of the pod housing 1 for rotating at least one propeller 5.

The electric propeller motor 3 has a rotor 6, a stator 7, an annular gap 8 between the rotor 6 and the stator 7, and gas channels 9 extending through the rotor 6.

The pod propulsion unit comprises a closed cooling gas circuit 10, wherein the annular gap 8 between the rotor 6 and the stator 7 and the gas channels 9 extending through the rotor 6 forms a part of the closed cooling gas circuit 10.

The pod propulsion unit comprises at least one fan 11 for circulating gas such as air in the closed cooling gas circuit 10.

The pod housing 1 comprises a strut section 12 between the hull 2 of the ship and the motor gondola 4.

The pod propulsion unit may comprise an gas-liquid heat exchanger 13 arranged in the closed cooling gas circuit 10 between the feeding duct 27 and the return duct 28 for exchanging thermal energy between gas flowing in the closed cooling gas circuit 10 and liquid circulating in at least one cooling liquid circuit 14.

By the rotor 6 of the electric propeller motor 3 has preferably, but not necessarily, two opposite rotor end faces 16, and the gas channels 9 in the rotor 6 extends preferably, but not necessarily, in the direction of rotation axis of the rotor 6 of the electric propeller motor 3 between said two opposite rotor end faces 16 of the rotor 6 of the electric propeller motor 3.

The cooling liquid circuit 14 may be a closed cooling liquid circuit. The closed cooling liquid circuit may be a part of a closed cooling liquid system of the ship.

The liquid circulating in the cooling liquid circuit 14 may be sea water and the cooling liquid circuit 14 may be an open cooling liquid circuit so that the cooling liquid circuit 14 has at least one inlet (not shown in the figures) for allowing sea water to enter the cooling liquid circuit 14 and at least one outlet (not shown in the figures) for allowing sea water to exit the cooling liquid circuit 14.

Figure 2:
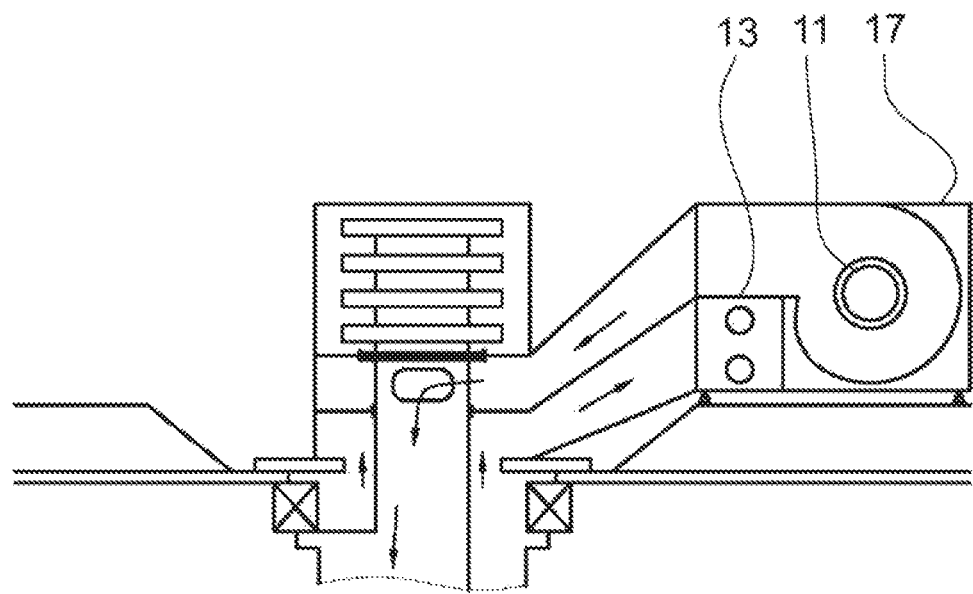

The fan 11 and the optional gas-liquid heat exchanger 13 may be parts of an independent cooling unit 17. The independent cooling unit 17 may be provided outside the pod housing 1 and within the hull 2 of the ship as shown in FIG. 2. The pod propulsion unit may comprise several such independent cooling units 17.

The stator 7 of the electric propeller motor 3 is fitted such as snug-fitted, form-fitted, shrink-fitted, snug-fitted and additionally glued, form-fitted and additionally glued, or shrink-fitted and additionally glued in a tubular section 18 of the motor gondola 4 of the pod propulsion unit. In such case, the tubular section 18 of the motor gondola 4 has a circumferential outer surface 19 that forms a part of the outer surface of the pod housing 1 so that the stator 7 of the electric propeller motor 3 is cooled to water surrounding the tubular section 18 of the motor gondola 4 through the wall (not marked with a reference numeral) of the tubular section 18 of the motor gondola 4.

The motor gondola 4 may be connected to the strut section 12 by means of a first connection section 20a and a second connection section 20b of the strut section 12, which said two connection sections 20 of the strut section 12 are spaced apart from each other so that an opening 21 is formed between the first connection section 20a and the second connection section 20b of the strut section 12 and the circumferential outer surface 19 of the tubular section 18 of the motor gondola 4 so that at least a part of said circumferential section of the circumferential outer surface 19 of the tubular section 18 of the motor gondola 4 is located in said opening 21. Alternatively, the motor gondola 4 may be connected to the strut section 12 by means of a first connection section 20a and a second connection section 20b of the strut section 12, which first connection section 20a and second connection section 20b of the strut section 12 being spaced apart from each other so that an opening 21 is formed between said first connection section 20a and said second connection section 20b of the strut section 12 and the circumferential outer surface 19 of the tubular section 18 of the motor gondola 4 and a lower surface 22 of the strut section 12 so that at least a part of said circumferential section of the circumferential outer surface 19 of the tubular section 18 of the motor gondola 4 is located in said opening 21. Such opening 21 may extend for at least for 50%, preferable for over 75%, more preferable for 90 to 110%, of a length of the stator 7 of the electric propeller motor 3. If the motor gondola 4 is be connected to the strut section 12 by means of a first connection section 20a and a second connection section 20b of the strut section 12, a part of the feeding duct 27 of the closed cooling gas circuit 10 may be in the first connection section 20a and a part of the return duct 28 of the closed cooling gas circuit 10 may be in the second connection section 20b.

The pod propulsion unit may include a first temperature sensor 23 for measuring temperature of the gas flowing in the closed cooling gas circuit 10 downstream of the electric propeller motor 3 and upstream of the gas-liquid heat exchanger 13, if the pod propulsion unit is provided with a gas-liquid heat exchanger 13, and a second temperature sensor 24 for measuring temperature of the gas flowing in the closed cooling gas circuit 10 upstream of the electric propeller motor 3 and downstream of the gas-liquid heat exchanger 13, if the pod propulsion unit is provided with a gas-liquid heat exchanger 13.

The optional gas-liquid heat exchanger 13 is preferably, but not necessarily, of double tube type in order to minimize the risk of cooling liquid leakage outside of the gas-liquid heat exchanger 13.

The pod propulsion unit may comprise a leakage sensor 40 for providing information about possible leakage of cooling liquid in the optional gas-liquid heat exchanger 13 connected to cooling liquid circuit 14.

The pod propulsion unit may comprise a humidity sensor 42 for measuring humidity of the gas flowing in the closed cooling gas circuit 10 upstream of the electric propeller motor 3 and downstream of the gas-liquid heat exchanger 13, if the pod propulsion unit is provided with a gas-liquid heat exchanger 13.

The pod propulsion unit may comprise a third temperature sensor 44 for measuring the temperature of the liquid circulating in said at least one cooling circuit.

The pod propulsion unit may comprise control means for controlling the fan 11 based on the temperature of the electric propeller motor 3.

The pod propulsion unit may comprise control means for controlling the fan 11 based on the power the electric propeller motor 3 produces.

The fan 11 may be provided within the hull 2 of the ship.

The optional gas-liquid heat exchanger 13 may be provided within the hull 2 of the ship.

The strut section 12 of the pod housing 1 may be attached to the ship by means of slewing bearing 25 for allowing turning of the pod housing 1 with respect to the hull 2 of the ship, as is shown in FIGS. 1 to 7. In such case, the pod propulsion unit comprises a slip ring 26 between a power plant 36 within the hull 2 of the ship and electrical propeller motor 3 within the pod housing 1 for supplying electrical power from the power plant 36 to the electrical propeller motor 3. In such case, the pod propulsion unit comprises electrical wiring 39 between the slip ring 26 and the electrical propeller motor 3 within the pod housing 1.

Figure 8:
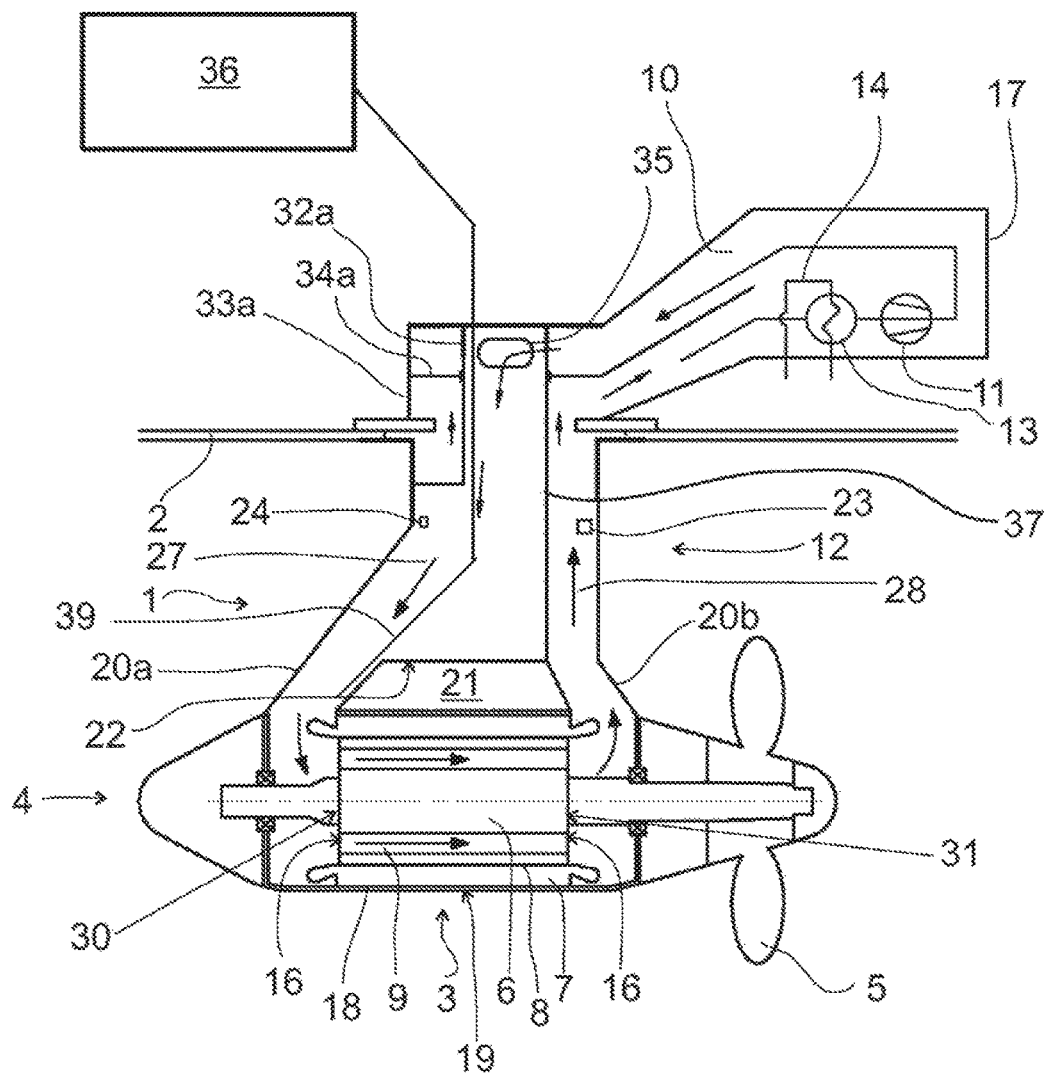
FIG. 8 shows the function principle of the cooling system of a pod propulsion unit according to a seventh embodiment.

Alternatively the strut section 12 of the pod housing 1 may be attached to the ship so that the pod housing 1 is unturnable attached to the ship i.e. non-turnable attached to the ship, as is the case in the seventh embodiment shown in FIG. 8.

The closed cooling gas circuit 10 comprises a feeding duct 27 and a return duct 28 for conducting gas between the pod housing 1 and the hull 2 of the ship, so that the electrical propeller motor 3 has a first motor end face 30 and an opposite second motor end face 31, and so that the feeding duct 27 extending between return duct 28 and the first motor end face 30 of the electrical propeller motor 3, and so that the return duct 28 extending between feeding duct and the opposite second motor end face 31 of the electrical propeller motor 3.

If the pod propulsion unit is provided with a gas-liquid heat exchanger 13, as in FIGS. 1, 3, 5 and 6 the closed cooling gas circuit 10 comprises a feeding duct 27 and a return duct 28 for conducting gas between the pod housing 1 and the hull 2 of the ship, so that the electrical propeller motor 3 has a first motor end face 30 and an opposite second motor end face 31, and so that the feeding duct 27 extending between the gas-liquid heat exchanger 13 and the first motor end face 30 of the electrical propeller motor 3, and so that the return duct 28 extending between the gas-liquid heat exchanger 13 and the opposite second motor end face 31 of the electrical propeller motor 3. If the strut section 12 pod housing 1 is attached to the ship by means of a slewing bearing as described earlier and the pod propulsion unit comprises a slip ring 26 as described earlier, the feeding duct 27 and the return duct 28 of the closed cooling gas circuit 10 is preferably, but not necessarily, configured to conduct gas past the slip-ring 26.

If the strut section 12 pod housing 1 is attached to the ship by means of a slewing bearing as described earlier and the pod propulsion unit comprises a slip ring 26 as described earlier, the slip-ring 26 is preferably, but not necessarily, arranged outside the closed cooling gas circuit 10.

Figure 5:
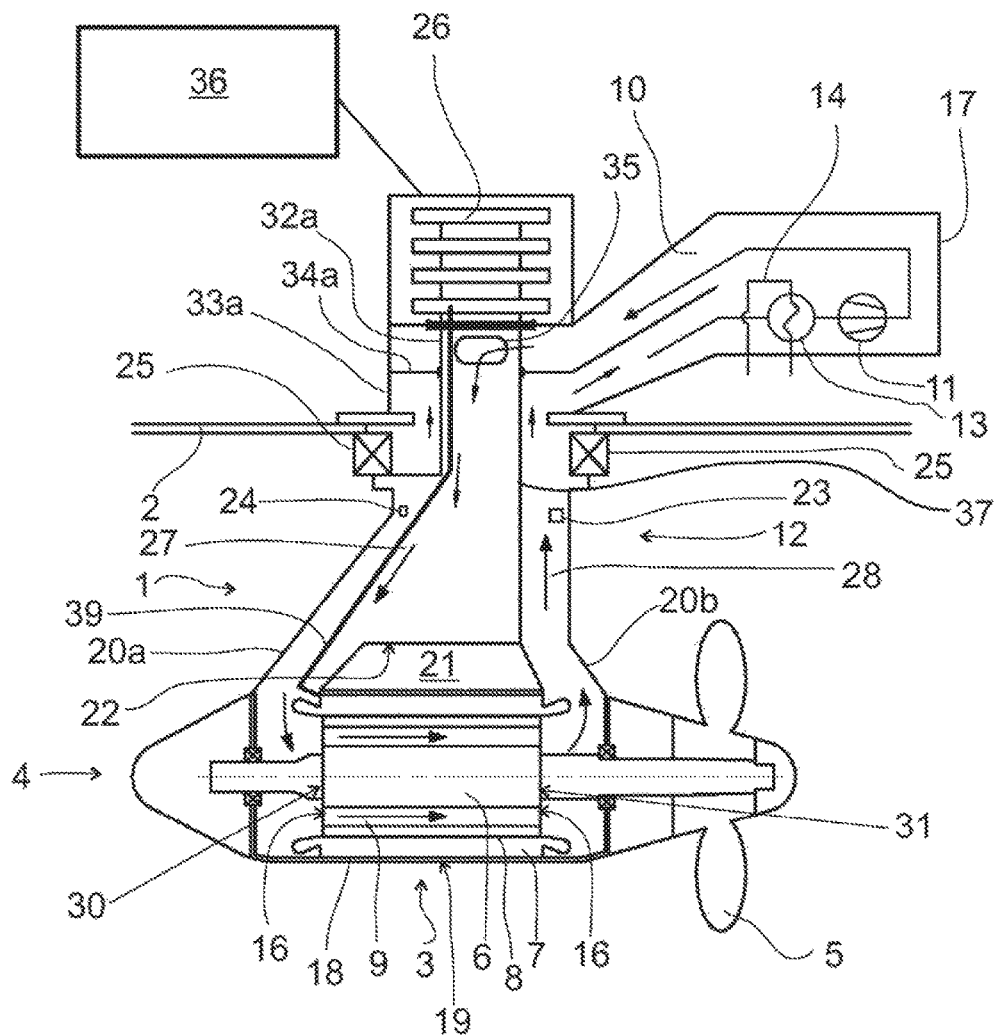
FIG. 5 shows the function principle of the cooling system of a pod propulsion unit according to a fourth embodiment.

If the strut section 12 pod housing 1 is attached to the ship by means of a slewing bearing as described earlier and the pod propulsion unit comprises a slip ring 26 as described earlier, the closed cooling gas circuit 10 may comprise a feeding duct 27 and a return duct 28 for conducting gas past the slip-ring, the feeding duct 27 may be arranged inside the return duct 28 at the level of the slewing bearing 25, as is the case in the first embodiment of the pod propulsion unit illustrated in FIG. 1 and in the fourth embodiment of the pod propulsion unit illustrated in FIG. 5. In the first embodiment of the pod propulsion unit illustrated in FIG. 1 and in the fourth embodiment of the pod propulsion unit illustrated in FIG. 5, the feeding duct 27 comprises a tubular rotating feeding duct section 32a, which is coaxial with the slewing bearing 25, which is configured to turn with the pod housing 1 with respect to the ship, and which is sealed to a separating wall 34a. In the first embodiment of the pod propulsion unit illustrated in FIG. 1 and in the fourth embodiment of the pod propulsion unit illustrated in FIG. 5, the return duct 28 comprises an annular return duct section 33a, which is coaxial with the slewing bearing 25 and coaxial with the tubular rotating feeding duct section 32a of the feeding duct 27, and which is stationarily arranged with respect to the ship. In the first embodiment of the pod propulsion unit illustrated in FIG. 1 and in the fourth embodiment of the pod propulsion unit illustrated in FIG. 5, the tubular rotating feeding duct section 32a of the feeding duct 27 and the annular return duct section 33a of the return duct 28 being provided in a region between the slip ring 26 and the motor gondola 4 of the pod housing 1. In the first embodiment of the pod propulsion unit illustrated in FIG. 1 and in the fourth embodiment of the pod propulsion unit illustrated in FIG. 5, the annular return duct section 33a ends in the separating wall 34a and the tubular rotating feeding duct section 32a is provided with at least one opening 35 for feeding gas into the tubular rotating feeding duct section 32a. The first embodiment of the pod propulsion unit illustrated in FIG. 1 and the fourth embodiment of the pod propulsion unit illustrated in FIG. 5 can be modified for example so that the tubular rotating feeding duct section 32a has a non-circular cross-section form, so that the annular return duct section 33a has a non-circular cross-section form and/or so that the tubular rotating feeding duct section 32a is asymmetrically arranged with respect to the annular return duct section 33a and to the slewing bearing 25 i.e. not coaxially with respect to the annular return duct section 33a and the slewing bearing 25.

Figure 3:
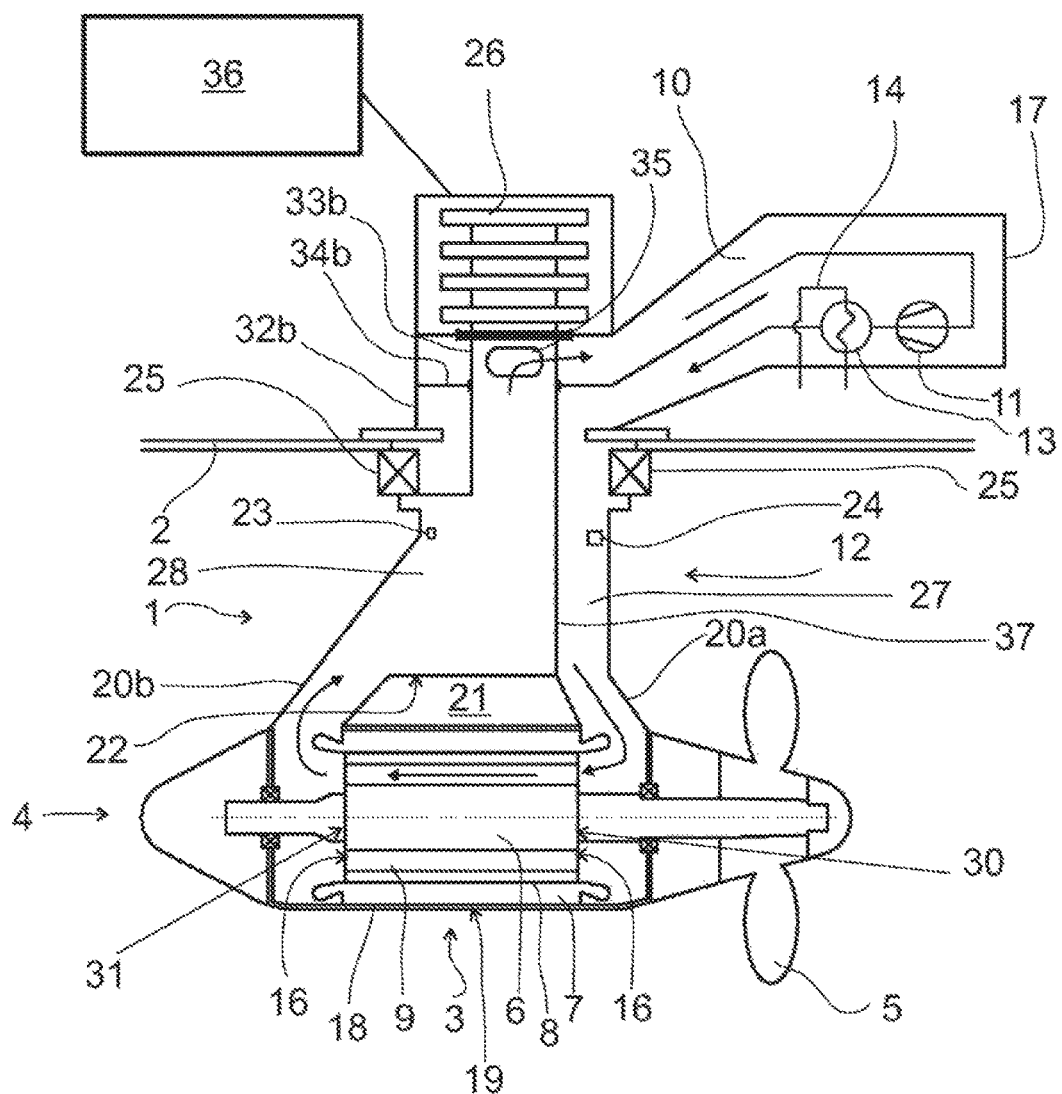
FIG. 3 shows the function principle of the cooling system of a pod propulsion unit according to a second embodiment.
Figure 6:
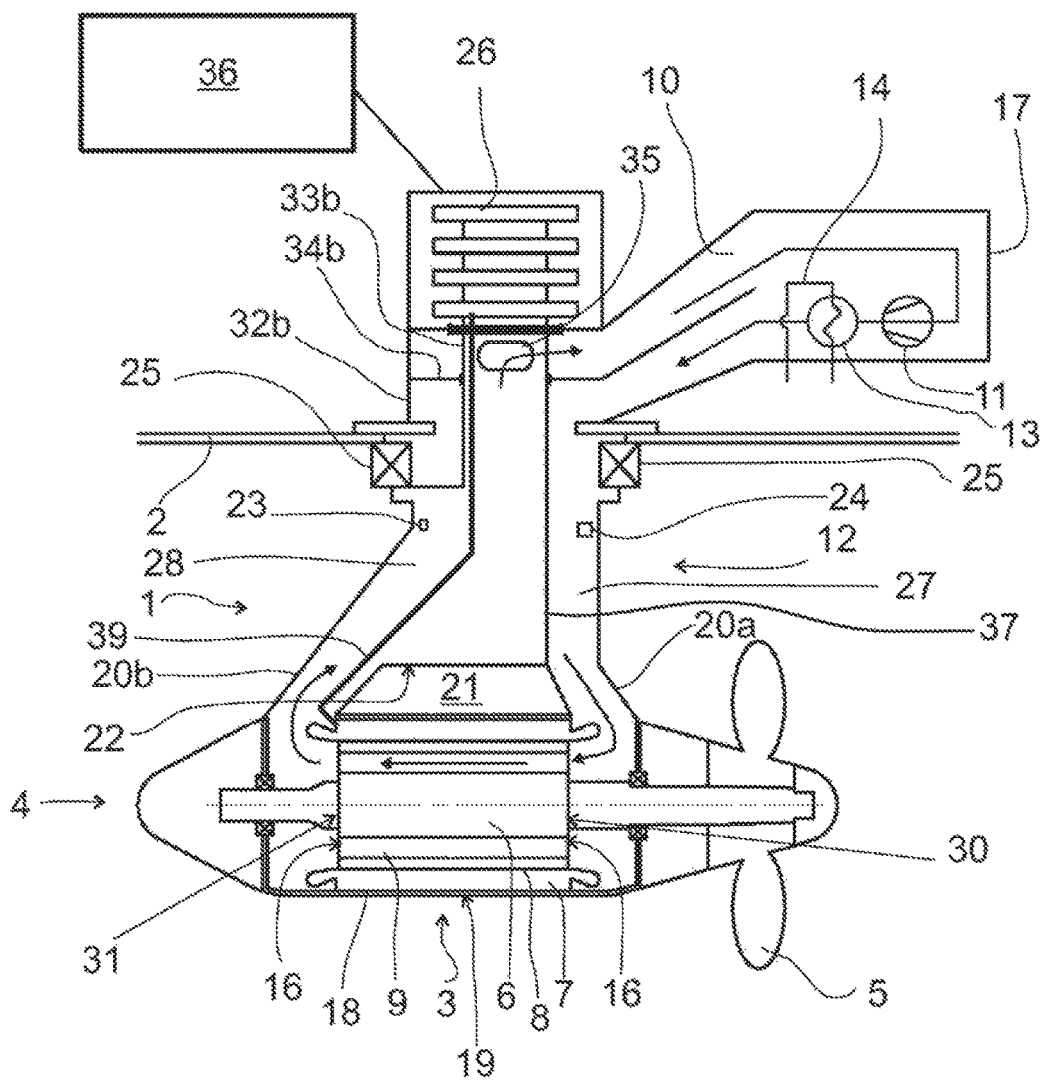
FIG. 6 shows the function principle of the cooling system of a pod propulsion unit according to a fifth embodiment.

If the strut section 12 pod housing 1 is attached to the ship by means of a slewing bearing as described earlier and the pod propulsion unit comprises a slip ring 26 as described earlier, the closed cooling gas circuit 10 may comprise a feeding duct 27 and a return duct 28 for conducting gas past the slip-ring, so that the return duct 28 may be arranged inside the feeding duct 27 at the level of the slewing bearing 25, as is the case in the second embodiment of the pod propulsion unit illustrated in FIG. 3 and in the fifth embodiment of the pod propulsion unit illustrated in FIG. 6. In the second embodiment of the pod propulsion unit illustrated in FIG. 3 and in the fifth embodiment of the pod propulsion unit illustrated in FIG. 6, the feeding duct 27 comprises an annular feeding duct section 32b, which is coaxial with the slewing bearing 25, which is stationarily arranged with respect to the ship. In the second embodiment of the pod propulsion unit illustrated in FIG. 3 and in the fifth embodiment of the pod propulsion unit illustrated in FIG. 6, the return duct 28 comprises a tubular rotating return duct section 336, which is coaxial with the slewing bearing 25 and coaxial with the annular feeding duct section 32b of the feeding duct 27, and which is configured to turn with the pod housing 1 with respect to the ship and which is sealed to a separating wall 34b. In the second embodiment of the pod propulsion unit illustrated in FIG. 3 and in the fifth embodiment of the pod propulsion unit illustrated in FIG. 6, the annular feeding duct section 32b of the feeding duct 27 and the tubular rotating return duct section 33b of the return duct 28 being provided in a region between the slip ring 26 and the motor gondola 4 of the pod housing 1. In the second embodiment of the pod propulsion unit illustrated in FIG. 3 and in the fifth embodiment of the pod propulsion unit illustrated in FIG. 6, the annular feeding duct section 32b ends in the separating wall 34b and the tubular rotating return duct section 33b is provided with at least one opening 35 for feeding gas from the tubular rotating return duct section 33b. The second embodiment of the pod propulsion unit illustrated in FIG. 3 and the fifth embodiment of the pod propulsion unit illustrated in FIG. 5 can be modified for example so that the tubular rotating return duct section 32b has a non-circular cross-section form, so that the annular feeding duct section 33b has a non-circular cross-section form and/or so that the tubular rotating return duct section 32b is asymmetrically arranged with respect to the annular feeding duct section 33b and to the slewing bearing 25 i.e. not coaxially with respect to the annular feeding duct section 33b and to the slewing bearing 25.

In the embodiments shown in FIGS. 1, 3, 4, 5, 6, 7, and 8, the closed gas feeding circuit 10 comprises a partition wall 37 in the pod housing 1 separating the feeding duct 27 from the return duct 28.

The closed cooling gas circuit 10 may be thermally connected with a wall of the strut section 12 of the pod housing 1.

The pod propulsion unit may comprise an additional fan (not shown in the drawings) for circulating gas in the closed cooling gas circuit 10, which additional stand by fan is configured to start automatically in case of a failure in the primary fan 11.

Figure 4:
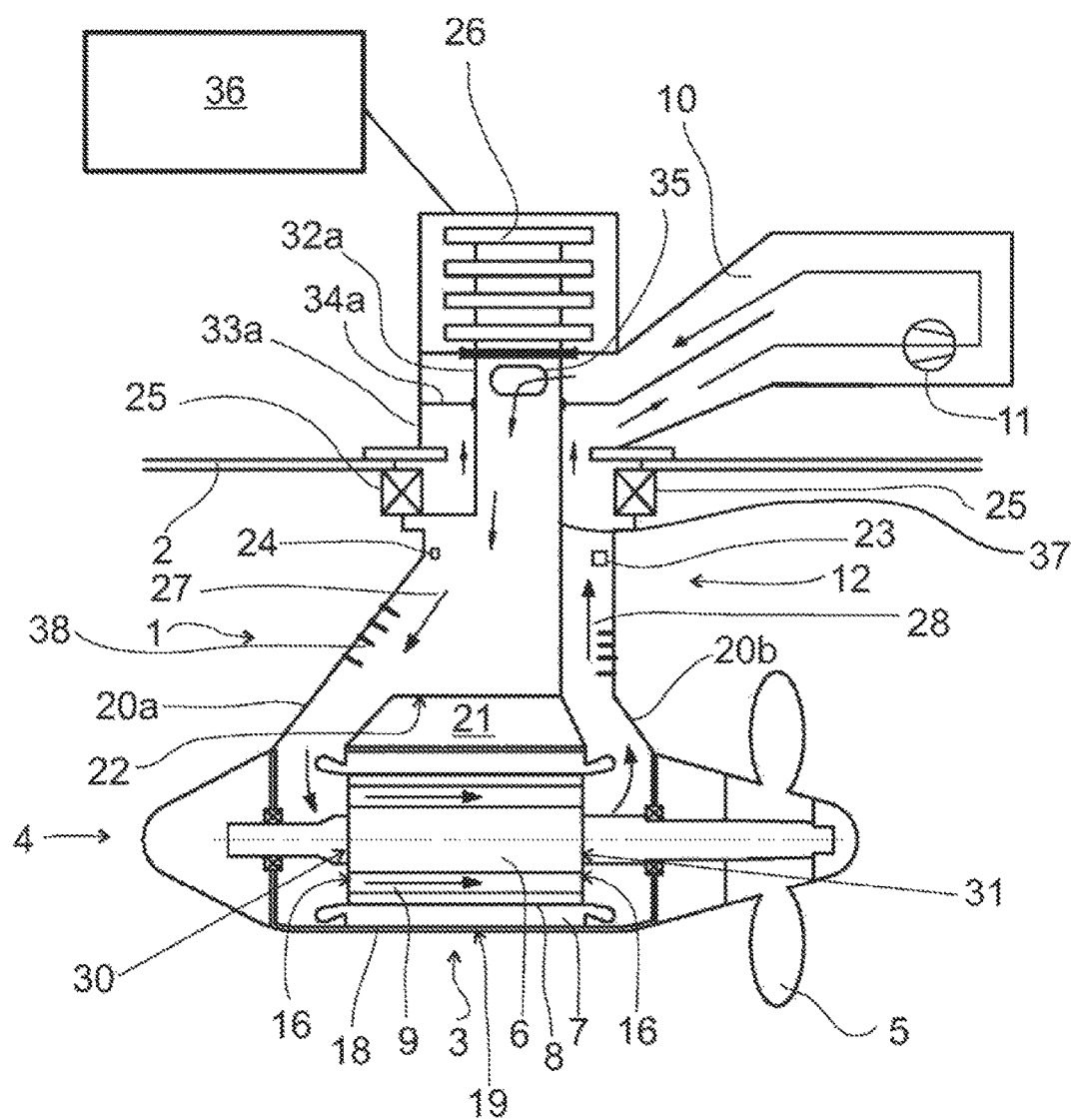
FIG. 4 shows the function principle of the cooling system of a pod propulsion unit according to a third embodiment.
Figure 7:
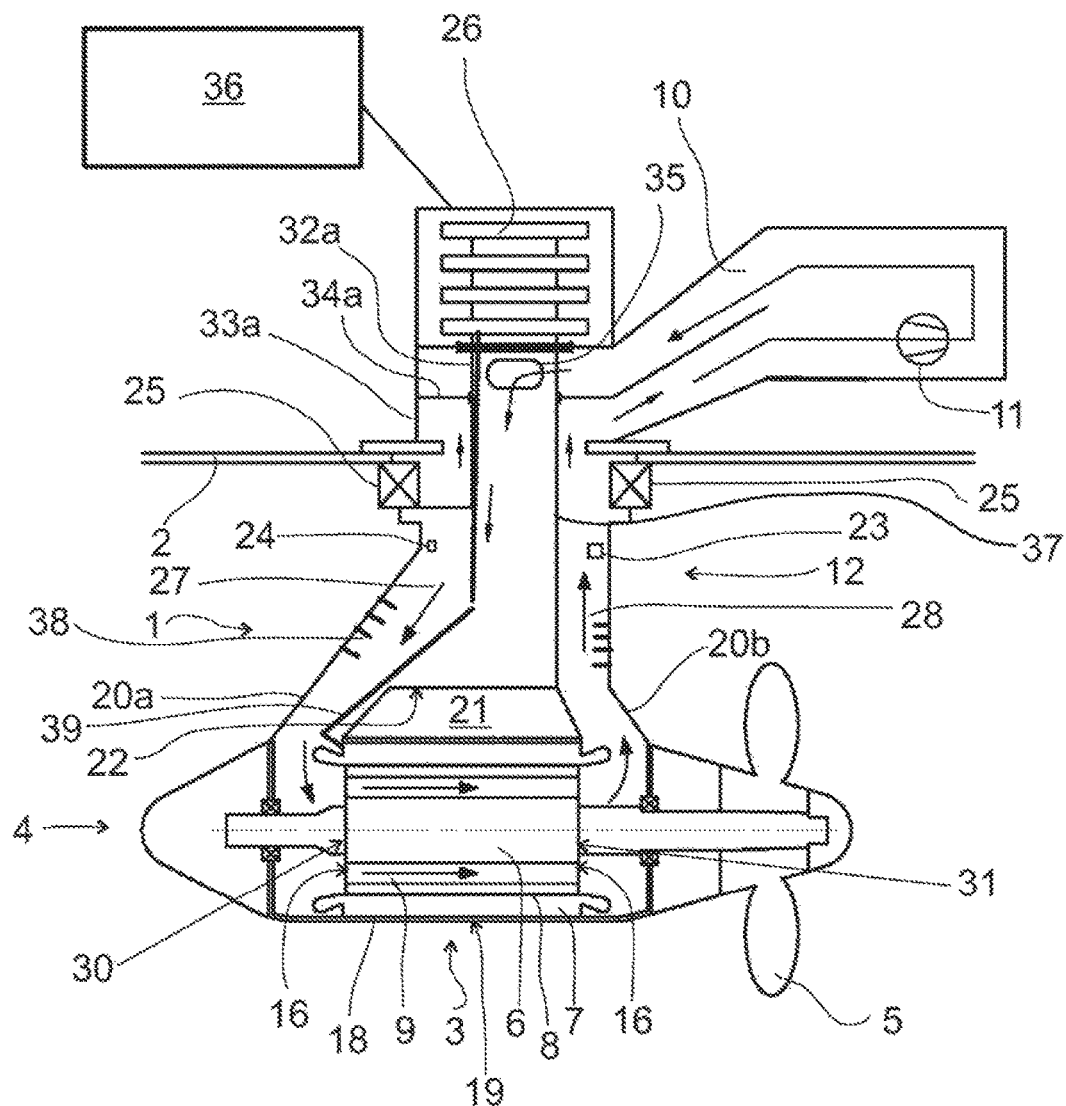
FIG. 7 shows the function principle of the cooling system of a pod propulsion unit according to a sixth embodiment.

The pod propulsion unit may, as in the third embodiment shown in FIG. 4 and as in the sixth embodiment illustrated in FIG. 7, comprise cooling fins 38 in the closed cooling gas circuit 10 and attached to the pod housing 1 of the pod propulsion unit for exchanging thermal energy between gas flowing in the closed cooling gas circuit 10 and water surrounding the pod housing 1.

The propeller motor 3 may be a synchronous electric motor or an asynchronous electric motor.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A pod propulsion unit of a ship, wherein the pod propulsion unit comprises a pod housing arranged at least partly below a hull of the ship, an electric propeller motor within a motor gondola of the pod housing for rotating at least one propeller, wherein the electric propeller motor having a rotor, a stator, an annular gap between the rotor and the stator, and gas channels extending through the rotor, a closed cooling gas circuit, wherein the annular gap between the rotor and the stator and the gas channels extending through the rotor forms a part of the closed cooling gas circuit, and a fan for circulating gas in the closed cooling gas circuit, wherein the pod housing comprises a strut section between the hull of the ship and the motor gondola, and wherein the stator of the electric propeller motor being fitted in a tubular section of the motor gondola of the pod housing of the pod propulsion unit, wherein:

the closed cooling gas circuit comprising a feeding duct and a return duct for conducting gas between the pod housing and the hull of the ship, the electrical propeller motor having a first motor end face and an opposite second motor end face, the feeding duct extending between the return duct and the first motor end face of the electrical propeller motor, and the return duct extending between the feeding duct and the opposite second motor end face of the electrical propeller motor, the tubular section of the motor gondola having a circumferential outer surface that forms a part of the outer surface of the pod housing, the stator of the electric propeller motor being cooled to water surrounding at least a circumferential section of the circumferential outer surface of the tubular section of the motor gondola through the wall of the tubular section of the motor gondola, and a gas-liquid heat exchanger arranged in the closed cooling gas circuit between the feeding duct and the return duct for exchanging thermal energy between gas flowing in the closed cooling gas circuit and liquid circulating in at least one cooling liquid circuit.

2. The pod propulsion unit according to claim 1, wherein the cooling liquid circuit being a closed cooling liquid circuit.

3. The pod propulsion unit according to claim 1, wherein the closed cooling liquid circuit being a part of a closed cooling liquid system of the ship.

4. The pod propulsion unit according to claim 1, wherein the fan and the gas-liquid heat exchanger being parts of an independent cooling unit.

5. The pod propulsion unit according to claim 4, wherein the independent cooling unit being provided outside the pod housing and within the hull of the ship.

6. The pod propulsion unit according to claim 1 which further comprises a first temperature sensor for measuring temperature of the gas flowing in the closed cooling gas circuit downstream of the electric propeller motor and upstream of the gas-liquid heat exchanger, and which further comprises a second temperature sensor for measuring temperature of the gas flowing in the closed cooling gas circuit upstream of the electric propeller motor and downstream of the gas-liquid heat exchanger.

7. The pod propulsion unit according to claim 1 which further comprises a leakage sensor providing information about leakage of cooling liquid in gas-liquid heat exchanger connected to cooling liquid circuit.

8. The pod propulsion unit according to claim 1 which further comprises a humidity sensor for measuring humidity of the gas flowing in the closed cooling gas circuit upstream of the electric propeller motor and downstream of the gas-liquid heat exchanger.

9. The pod propulsion unit according to claim 1 which further comprises a third temperature sensor for measuring the temperature of the liquid circulating in said at least one cooling circuit.

10. The pod propulsion unit according to claim 1 which further comprises cooling fins in the closed cooling gas circuit and attached to the pod housing of the pod propulsion unit for exchanging thermal energy between gas flowing in the closed cooling gas circuit and water surrounding the pod housing.

11. The pod propulsion unit according to claim 1 wherein the motor gondola being connected to the strut section by means of a first connection section and a second connection section of the strut section,
   wherein the first connection section and the second connection section of the strut section being spaced apart from each other so that an opening is formed between the first connection section and the second connection section of the strut section and the circumferential outer surface of the tubular section of the motor gondola, and by at least a part of said circumferential section of the circumferential outer surface of the tubular section of the motor gondola being located in said opening.

12. The pod propulsion unit according to claim 11, wherein the opening extending at least for 50%, of a length of the stator of the electric propeller motor.

13. The pod propulsion unit according to claim 11, wherein
   a part of the feeding duct of the closed cooling gas circuit is in the first connection section, and
   a part of the return duct of the closed cooling gas circuit is in the second connection section.

14. The pod propulsion unit according to claim 1 wherein
   the strut section of the pod housing being attached to the ship by means of slewing bearing for allowing turning of the pod housing with respect to the hull of the ship, and
   the pod propulsion unit comprising a slip ring between a power plant within the hull of the ship and electrical propeller motor within the pod housing for supplying electrical power from the power plant to the electrical propeller motor.

15. The pod propulsion unit according to claim 14, wherein the feeding duct and the return duct of the closed cooling gas circuit being configured to conduct gas past the slip-ring.

16. The pod propulsion unit according to claim 14, wherein the slip-ring being arranged outside the closed cooling gas circuit.

17. The pod propulsion unit according to claim 14 wherein the feeding duct is arranged inside the return duct at the level of the slewing bearing.

18. The pod propulsion unit according to claim 17, wherein
   the feeding duct comprising a tubular rotating feeding duct section, which is coaxial with the slewing bearing, and which is configured to turn with the pod housing with respect to the ship,
   the return duct comprising an annular return duct section, which is coaxial with the slewing bearing and coaxial with the tubular rotating feeding duct section of the feeding duct, and which is stationarily arranged with respect to the ship, and
   the tubular rotating feeding duct section of the feeding duct and the annular return duct section of the return duct being provided in a region between the slip ring and the motor gondola of the pod housing.

19. The pod propulsion unit according to claim 14 wherein the return duct is arranged inside the feeding duct at the level of the slewing bearing.

20. The pod propulsion unit according to claim 19, wherein
   the feeding duct comprising an annular feeding duct section, which is coaxial with the slewing bearing and which is stationarily arranged with respect to the ship, by the return duct comprising a tubular rotating return duct section, which is coaxial with the slewing bearing and coaxial with the annular feeding duct section of the feeding duct, and which is configured to turn with the pod housing with respect to the ship, and
   the annular feeding duct section of the feeding duct and the tubular rotating return duct section of the return duct being provided in a region between the slip ring and the motor gondola of the pod housing.

21. The pod propulsion unit according to claim 1 wherein the electric propeller motor being an asynchronous electric motor.

22. The pod propulsion unit according to claim 1 wherein the electric propeller motor being a synchronous electric motor.

* * * * *

(12) EX PARTE REEXAMINATION CERTIFICATE (172nd)
Ex Parte Reexamination Ordered under 35 U.S.C. 257

United States Patent
Kosso et al.

(10) Number: US 10,336,430 C1
(45) Certificate Issued: Jul. 1, 2020

(54) POD PROPULSION UNIT OF A SHIP

(71) Applicant: ABB Schweiz AG, Baden (CH)

(72) Inventors: Antto Kosso, Helsinki (FI); Lasse Lahtinen, Vantaa (FI); Petri Säkkinen, Espoo (FI)

(73) Assignee: ABB SCHWEIZ AG

Supplemental Examination Request:
No. 96/000,300, Oct. 30, 2019

Reexamination Certificate for:
Patent No.: 10,336,430
Issued: Jul. 2, 2019
Appl. No.: 15/363,973
Filed: Nov. 29, 2016

Related U.S. Application Data

(63) Continuation of application No. PCT/EP2015/061269, filed on May 21, 2015.

(30) Foreign Application Priority Data

May 30, 2014 (EP) .................................. 14170562

(51) Int. Cl.
| | |
|---|---|
| *B63H 21/17* | (2006.01) |
| *H02K 9/10* | (2006.01) |
| *H02K 21/00* | (2006.01) |
| *B63J 2/12* | (2006.01) |
| *H02K 9/12* | (2006.01) |
| *B63H 23/24* | (2006.01) |
| *B63H 5/125* | (2006.01) |

(52) U.S. Cl.
CPC ............... *B63H 21/17* (2013.01); *B63J 2/12* (2013.01); *H02K 9/10* (2013.01); *H02K 9/12* (2013.01); *H02K 21/00* (2013.01); *B63H 23/24* (2013.01); *B63H 2005/1258* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,300, please refer to the USPTO's public Patent Application Information Retrieval (PAIR) system under the Display References tab.

*Primary Examiner* — Peter C English

(57) ABSTRACT

The invention relates to a pod propulsion unit of a ship. The pod propulsion unit comprises a pod housing arranged at least partly below a hull of the ship, an electric propeller motor within a motor gondola of the pod housing, an annular gap between a rotor and a stator of the electric propeller motor, and gas channels extending through the rotor, a closed cooling gas circuit, and a fan for circulating gas in the closed cooling gas circuit. The closed cooling gas circuit comprising a feeding duct extending between the return duct and the first motor end face of the electrical propeller motor, and a return duct extending between the feeding duct and the opposite second motor end face of the electrical propeller motor.

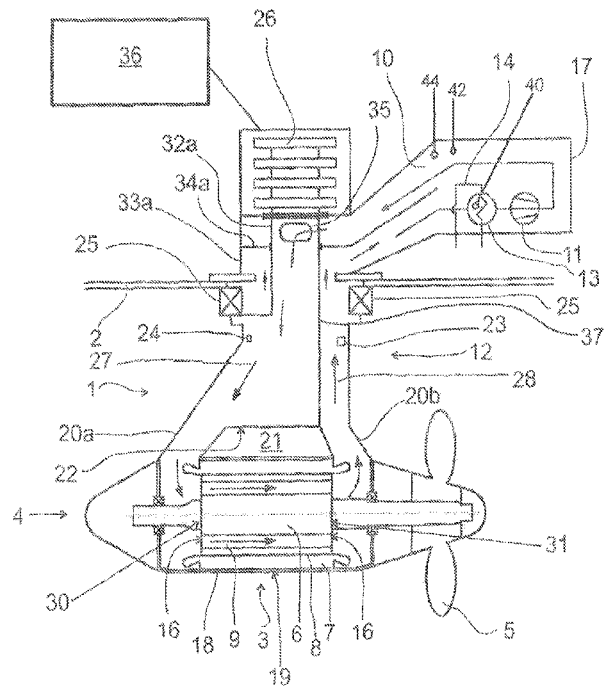

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 7-9, 14 and 17-20 are cancelled.

Claims 1, 6, 10-12, 15, 16, 21 and 22 are determined to be patentable as amended.

Claims 2, 4, 5 and 13, dependent on an amended claim, are determined to be patentable.

New claims 23-35 are added and determined to be patentable.

1. A pod propulsion unit of a ship, wherein the pod propulsion unit comprises
   a pod housing arranged at least partly below a hull of the ship,
   an electric propeller motor within a motor gondola of the pod housing for rotating [at least] one propeller, wherein the electric propeller motor having a rotor, a stator, an annular gap between the rotor and the stator, and gas channels extending through the rotor,
   a closed cooling gas circuit, wherein the annular gap between the rotor and the stator and the gas channels extending through the rotor [forms] *form* part of the closed cooling gas circuit, and
   a fan *arranged in the closed cooling gas circuit* for circulating gas in the closed cooling gas circuit,
   wherein the pod housing comprises a strut section between the hull of the ship and the motor gondola, and
   wherein the stator of the electric propeller motor being fitted in a tubular section of the motor gondola of the pod housing of the pod propulsion unit,
   wherein:
   the closed cooling gas circuit comprising a feeding duct and a return duct for conducting gas between the pod housing and the hull of the ship,
   the [electrical] *electric* propeller motor having a first motor end face and an opposite second motor end face,
   [the feeding duct extending between the return duct and the first motor end face of the electrical propeller motor, and
   the return duct extending between the feeding duct and the opposite second motor end face of the electrical propeller motor,]
   the tubular section of the motor gondola having a circumferential outer surface that forms a part of [the] *an* outer surface of the pod housing,
   the stator of the electric propeller motor being cooled to water surrounding at least a circumferential section of the circumferential outer surface of the tubular section of the motor gondola through [the] *a* wall of the tubular section of the motor gondola, [and]
   a gas-liquid heat exchanger arranged in the closed cooling gas circuit [between the feeding duct and the return duct] for exchanging thermal energy between gas flowing in the closed cooling gas circuit and liquid circulating in [at least] one cooling liquid circuit,
   *the feeding duct of the closed cooling gas circuit extending between the fan arranged in the closed cooling gas circuit and the first motor end face of the electric propeller motor,*
   *the return duct of the closed cooling gas circuit extending between the gas-liquid heat exchanger arranged in the closed cooling gas circuit and the opposite second motor end face of the electric propeller motor,*
   *the strut section of the pod housing being attached to the ship by means of a slewing bearing for allowing turning of the pod housing with respect to the hull of the ship,*
   *the pod propulsion unit comprising a slip ring between a power plant within the hull of the ship and the electric propeller motor within the pod housing for supplying electrical power from the power plant to the electric propeller motor,*
   *the feeding duct is arranged inside the return duct at the slewing bearing,*
   *the feeding duct comprising a tubular rotating feeding duct section, which is coaxial with the slewing bearing, and which is configured to turn with the pod housing with respect to the ship,*
   *the return duct comprising an annular return duct section, which is coaxial with the slewing bearing and coaxial with the tubular rotating feeding duct section of the feeding duct, and which is stationarily arranged with respect to the ship, and*
   *the tubular rotating feeding duct section of the feeding duct and the annular return duct section of the return duct being provided in a region between the slip ring and the motor gondola of the pod housing.*

6. The pod propulsion unit according to claim 1, which further comprises a first temperature sensor for measuring temperature of the gas flowing in the closed cooling gas circuit downstream of the electric propeller motor and upstream of the gas-liquid heat exchanger, and
   which further comprises a second temperature sensor for measuring temperature of the gas flowing in the closed cooling gas circuit upstream of the electric propeller motor and downstream of the gas-liquid heat exchanger.

10. The pod propulsion unit according to claim 1, which further comprises cooling fins in the closed cooling gas circuit and attached to the pod housing of the pod propulsion unit for exchanging thermal energy between gas flowing in the closed cooling gas circuit and water surrounding the pod housing.

11. The pod propulsion unit according to claim 1, wherein *the strut section comprises a first connection section and a second connection section, and* the motor gondola being connected to the strut section by means of [a] *the* the first connection section and [a] *the* the second connection section of the strut section,
    wherein the first connection section and the second connection section of the strut section being spaced apart from each other so that an opening is formed between the first connection section and the second connection section of the strut section and the circumferential outer surface of the tubular section of the motor gondola, and [by] *wherein* at least a part of said circumferential section of the circumferential outer surface of the tubular section of the motor gondola being located in said opening.

12. The pod propulsion unit according to claim 11, wherein the opening extending at least [for] 50%[,] of a length of the stator of the electric propeller motor.

15. The pod propulsion unit according to claim [14] *1*, wherein the feeding duct and the return duct of the closed cooling gas circuit being configured to conduct gas past the [slip-ring] *slip ring*.

16. The pod propulsion unit according to claim [14] *1*, wherein the [slip-ring] *slip ring* being arranged outside the closed cooling gas circuit.

21. The pod propulsion unit according to claim 1, wherein the electric propeller motor being an asynchronous electric motor.

22. The pod propulsion unit according to claim 1, wherein the electric propeller motor being a synchronous electric motor.

23. *A pod propulsion unit of a ship, wherein the pod propulsion unit comprises*
- *a pod housing arranged at least partly below a hull of the ship,*
- *an electric propeller motor within a motor gondola of the pod housing for rotating one propeller, wherein the electric propeller motor having a rotor, a stator, an annular pap between the rotor and the stator, and gas channels extending through the rotor,*
- *a closed cooling gas circuit, wherein the annular gap between the rotor and the stator and the gas channels extending through the rotor form a part of the closed cooling gas circuit, and*
- *a fan arranged in the closed cooling gas circuit for circulating gas in the closed cooling gas circuit,*
- *wherein the pod housing comprises a strut section between the hull of the ship and the motor gondola, and*
- *wherein the stator of the electric propeller motor being fitted in a tubular section of the motor gondola of the pod housing of the pod propulsion unit,*
- *wherein:*
  - *the closed cooling gas circuit comprising a feeding duct and a return duct for conducting gas between the pod housing and the hull of the ship,*
  - *the electric propeller motor having a first motor end face and an opposite second motor end face,*
  - *the tubular section of the motor gondola having a circumferential outer surface that forms a part of an outer surface of the pod housing,*
  - *the stator of the electric propeller motor being cooled to water surrounding at least a circumferential section of the circumferential outer surface of the tubular section of the motor gondola through a wall of the tubular section of the motor gondola,*
  - *a gas-liquid heat exchanger arranged in the closed cooling gas circuit for exchanging thermal energy between gas flowing in the closed cooling gas circuit and liquid circulating in one cooling liquid circuit,*
  - *the feeding duct of the closed cooling gas circuit extending between the gas-liquid heat exchanger arranged in the closed cooling gas circuit and the first motor end face of the electric propeller motor,*
  - *the return duct of the closed cooling gas circuit extending between the fan arranged in the closed cooling gas circuit and the opposite second motor end face of the electric propeller motor,*
  - *the strut section of the pod housing being attached to the ship by means of a slewing bearing for allowing turning of the pod housing with respect to the hull of the ship,*
  - *the pod propulsion unit comprising a slip ring between a power plant within the hull of the ship and the electric propeller motor within the pod housing for supplying electrical power from the power plant to the electric propeller motor,*
  - *the return duct is arranged inside the feeding duct at the slewing bearing,*
  - *the feeding duct comprising an annular feeding duct section, which is coaxial with the slewing bearing and which is stationarily arranged with respect to the ship,*
  - *the return duct comprising a tubular rotating return duct section, which is coaxial with the slewing bearing and coaxial with the annular feeding duct section of the feeding duct, and which is configured to turn with the pod housing with respect to the ship, and*
  - *the annular feeding duct section of the feeding duct and the tubular rotating return duct section of the return duct being provided in a region between the slip ring and the motor gondola of the pod housing.*

24. *The pod propulsion unit according to claim 23, wherein the cooling liquid circuit being a closed cooling liquid circuit.*

25. *The pod propulsion unit according to claim 23, wherein the fan and the gas-liquid heat exchanger being parts of an independent cooling unit.*

26. *The pod propulsion unit according to claim 25, wherein the independent cooling unit being provided outside the pod housing and within the hull of the ship.*

27. *The pod propulsion unit according to claim 23, which further comprises a first temperature sensor for measuring temperature of the gas flowing in the closed cooling gas circuit downstream of the electric propeller motor and upstream of the gas-liquid heat exchanger, and*
- *which further comprises a second temperature sensor for measuring temperature of the gas flowing in the closed cooling gas circuit upstream of the electric propeller motor and downstream of the gas-liquid heat exchanger.*

28. *The pod propulsion unit according to claim 23, which further comprises cooling fins in the closed cooling gas circuit and attached to the pod housing of the pod propulsion unit for exchanging thermal energy between gas flowing in the closed cooling gas circuit and water surrounding the pod housing.*

29. *The pod propulsion unit according to claim 23, wherein the strut section comprises a first connection section and a second connection section, and the motor gondola being connected to the strut section by means of the first connection section and the second connection section of the strut section,*
- *wherein the first connection section and the second connection section of the strut section being spaced apart from each other so that an opening is formed between the first connection section and the second connection section of the strut section and the circumferential outer surface of the tubular section of the motor gondola, and wherein at least a part of said circumferential section of the circumferential outer surface of the tubular section of the motor gondola being located in said opening.*

30. *The pod propulsion unit according to claim 29, wherein the opening extending at least 50% of a length of the stator of the electric propeller motor.*

31. *The pod propulsion unit according to claim 29, wherein*
- *a part of the feeding duct of the closed cooling gas circuit is in the first connection section, and*
- *a part of the return duct of the closed cooling gas circuit is in the second connection section.*

32. The pod propulsion unit according to claim 23, wherein the feeding duct and the return duct of the closed cooling gas circuit being configured to conduct gas past the slip ring.

33. The pod propulsion unit according to claim 23, wherein the slip ring being arranged outside the closed cooling gas circuit.

34. The pod propulsion unit according to claim 23, wherein the electric propeller motor being an asynchronous electric motor.

35. The pod propulsion unit according to claim 23, wherein the electric propeller motor being a synchronous electric motor.

\* \* \* \* \*